United States Patent
Plaschke et al.

[11] Patent Number: 6,023,622
[45] Date of Patent: Feb. 8, 2000

[54] WIRELESS COMMUNICATION SYSTEM WITH DYNAMIC CHANNEL ALLOCATION

[75] Inventors: John Plaschke, Gaithersburg; Jelena Vucetic; Paul A. Kline, both of Germantown, all of Md.

[73] Assignee: Watkins-Johnson Company, Palo Alto, Calif.

[21] Appl. No.: 08/811,574

[22] Filed: Mar. 5, 1997

[51] Int. Cl.[7] .................................................. H04B 15/00
[52] U.S. Cl. ............................ 455/452; 455/63; 455/67.3
[58] Field of Search .................................... 455/422, 450, 455/452, 453, 62, 63, 446, 67.1, 67.3

[56] References Cited

U.S. PATENT DOCUMENTS

| | | | |
|---|---|---|---|
| 5,157,709 | 10/1992 | Ohteru | 455/452 |
| 5,179,722 | 1/1993 | Gunmar et al. | 455/63 |
| 5,410,737 | 4/1995 | Jones | 455/56.1 |
| 5,442,804 | 8/1995 | Gunmar et al. | 455/33.1 |

*Primary Examiner*—Thanh Cong Le
*Attorney, Agent, or Firm*—Flehr Hohbach Test Albritton & Herbert LLP

[57] ABSTRACT

A plurality of base stations communicate with a plurality of mobile units. Each base station includes a base station transceiver that receives inbound information from the mobile units and transmits outbound information to the mobile units. A mobile switching center (MSC) is coupled to the base stations and communicates the inbound information and outbound information with the base stations. The base stations each include signal detectors that detect signal strength of the inbound information, co-channel information and adjacent channel information. The MSC maintains a table of signal strength per communication channel and allocates communication channels to the base stations based on the signal strength information. The inventive dynamic channel allocation includes several channel allocation algorithms that can be active at the same time. Only one of the algorithms is active at a time. The choice of the algorithm is based on current interference conditions and traffic load. The invention is implemented in the MSC and base stations of a digital cellular network using wideband technology for its air interface. While the decision-making mechanism and the channel allocation algorithms are implemented in the MSC, the protocol between the MSC and base stations is extended to support the proposed concept for dynamic channel allocation. Advantages of the invention includes improved communication and reduced interference.

6 Claims, 5 Drawing Sheets

*A Two-Dimensional Model of a Cellular Network*

FIG. 1

*Selectivity Using DSP Techniques*

FIG. 2

Format of SCCP Messages

FIG. 3

Four-Cell Cluster

FIG. 4a

Seven-Cell Cluster

FIG. 4b

A Mobile Handed over from Cell A to Cell D

FIG. 5

Throughput vs. Offered Load for Different Channel Allocation Algorithms
(Uniform Load)

FIG. 6

Throughput vs. Offered Load for Different Channel Allocation Algorithms
(Non-Uniform Load)

FIG. 7

Throughput vs. Offered Load for Varied Configurations of Base Stations
(Uniform Load)

WIRELESS COMMUNICATION SYSTEM WITH DYNAMIC CHANNEL ALLOCATION

RELATED REFERENCES

The present application incorporates the following by reference:

Kline et al., Wideband Base Station Architecture for Digital Cellular Communications System, U.S. Ser. No. 08/504,175, filed Jul. 19, 1995; and the references listed in APPENDIX 1.

FIELD

The invention relates to a wireless communication system with dynamic channel allocation. In particular, the invention provides the capability to dynamically allocate wireless communication channels to improve communication and reduce interference.

BACKGROUND

Wireless communication is becoming increasingly popular. A traditional wireless communication system is constructed from a plurality of cells each having a base station. When the cells are configured in a mosaic-like pattern, wireless communication coverage area is achieved. Traditional wireless communication systems employ various communication techniques on dedicated channels and spread spectrum channels. These various techniques include protocols such as TDMA, FDMA and CDMA. However, these techniques do not provide for the need to avoid interference among neighboring cells in a cellular network. Some implementations dedicate various frequencies or hop sequences to distant cells in an attempt to avoid interference. While these implementations may work in some cases, they employ rigid rules that do not account for interference that may occur between some distant cells from time to time, and the lack of interference between other distant cells. That is, the rigid rules do not model the true communication environment and may either under compensate for interference or over compensate for interference.

When greater numbers of users desire to use the system, the traditional techniques of avoiding interference are inadequate and may cause dropped calls, interference or denial of access do to the rigid rules. In order to provide for ever-increasing communication density, systems must be developed that can intelligently allocate available communication channels in order to improve communication and reduce interference.

SUMMARY

The invention relates to a wireless communication system with dynamic channel allocation. In particular, the invention provides the capability to dynamically allocate wireless communication channels to improve communication and reduce interference.

A plurality of base stations communicate with a plurality of mobile units. Each base station includes a base station transceiver that receives inbound information from the mobile units and transmits outbound information to the mobile units. A mobile switching center (MSC) is coupled to the base stations and communicates the inbound information and outbound information with the base stations. The base stations each include signal detectors that detect signal strength of the inbound signals, co-channel signals and adjacent channel signals. The MSC maintains a table of signal strength per communication channel and allocates communication channels to the base stations based on the signal strength information.

The inventive dynamic channel allocation system includes several channel allocation algorithms that can be active at the same time. Only one of the algorithms is active at any one time. The choice of the algorithm is based on current interference conditions and traffic load. The invention is implemented in the MSC and base stations of a digital cellular network using wideband technology for its air interface. While the decision-making mechanism and the channel allocation algorithms are implemented in the MSC, the protocol between the MSC and base stations is extended to support the proposed concept for dynamic channel allocation.

The invention provides improvement in the overall network throughput for several reasons: a) the selection of channel allocation algorithm according to the interference and traffic load conditions; b) the utilization of wideband technology provides better selectivity of filters and improves channel reusability in the network.

Advantages of the invention includes improved communication and reduced interference.

DESCRIPTION OF THE FIGURES

Additional objects and features of the invention will be more readily apparent from the following detailed description and the claims when taken in conjunction with the drawings, in which:

DETAILED DESCRIPTION

The invention relates to a wireless communication system with dynamic channel allocation. In particular, the invention provides the capability to dynamically allocate wireless communication channels to improve communication and reduce interference.

1. INTRODUCTION

Major goals in design and implementation of cellular networks are to provide high throughput, as well as reliable and high quality wireless communications among mobile users. To achieve better utilization of radio spectrum, a spectrum reuse mechanism is implemented [Jak74, Lee89, Par89]. The same radio channels can be used simultaneously in different cells of the network as long as interference constraints are obeyed.

The present specification describes how probability of blocking can be reduced using digital wideband technology, and a multi-algorithm dynamic channel allocation concept implemented in the MSC of a cellular network. The invention addresses various design and implementation issues which are tightly related to dynamic channel allocation, and which are innovations compared to the already existing related solutions [And90, Eve89, Gam86, Nag87, Nan90, Taj88, Zha89b]. These issues are: advantages of digital filters for improving the spectrum reuse possibilities in cellular networks, periodical measurements of traffic and interference conditions, simultaneous implementation of several channel allocation algorithms in the network MSC, choice of the algorithm which provides the lowest probability of blocking for measured traffic and interference conditions, expansion of the standard communication protocol between the MSC and base stations (A+ interface) to support dynamic channel allocation, implementation of the expanded protocol in the MSC and base stations, soft handoff and other issues.

A model of a cellular network is described in Section 2. Data structures that are used during dynamic channel allocation are defined in Section 3. Functions that can be executed using the data structures are described in Section 4. Section 5 provides definitions and measurements of co-channel and adjacent-channel interference. In Section 6, definitions and measurements of offered load are given. Section 7 describes a dynamic channel allocation concept and its implementation in a cellular network, assuming that interference constraints and offered load are dynamically updated. Both single- and multi-algorithm dynamic channel allocation concepts are discussed. Section 8 presents performance analysis of a network implementing the features described above. A conclusion is given in Section 9.

2. A MODEL OF A CELLULAR NETWORK

Figure 1:
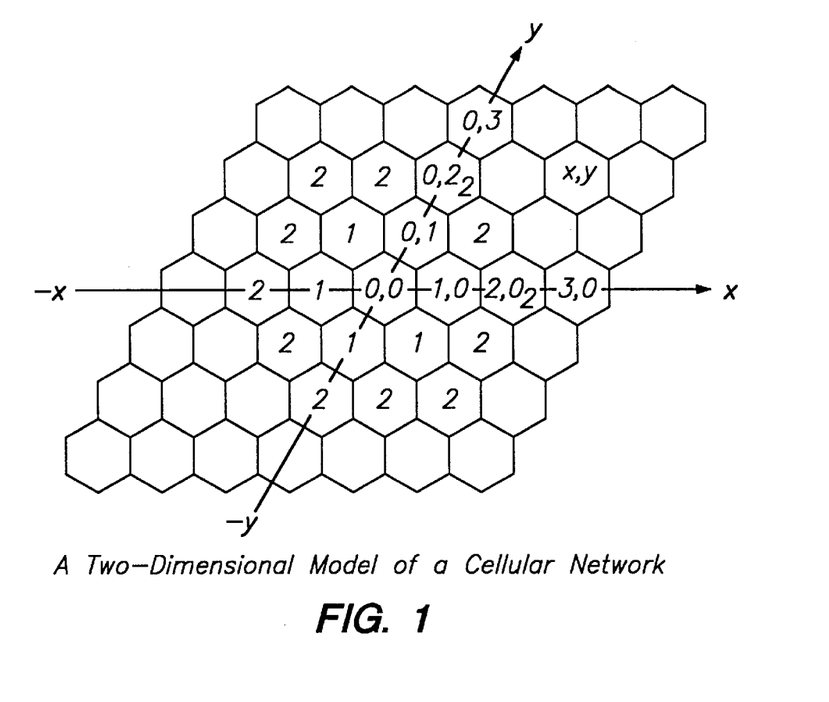
FIG. 1 illustrates a two-dimensional model of a cellular network.

Cellular networks are usually modeled as sets of hexagonal cells which represent radio coverage areas [Jak74, Lee89, Par89]. We use a two-dimensional model of cellular networks [Vuc93b] with two-dimensional notation of cells, as is shown in FIG. 1. Dimensions (x,y) of the network are $X_{max}$ and $Y_{max}$, respectively. Each cell is assigned a unique notation (x,y), where:

$$-X_{max}/2 \leq x \leq X_{max}/2, \text{ and } -Y_{max}/2 \leq y \leq Y_{max}/2.$$

For simplicity, we introduce a (x,y)→ A transformation from two-dimensional to one-dimensional cell notation. It is implemented as a look-up table (Transform Table (TT)) in the MSC global memory so that:

$$TT[x][y]=A$$

Two cells are denoted in neighbors if there is a possibility of interference between them. We assume that interference between cells $(x_1,y_1)$ and $(x_2,y_2)$ can be neglected if $x_1 > x_2 \pm 2$, and/or $y_1 > y_2 \pm 2$. Under this assumption, each cell may have up to 19 neighbors: the cell itself, and the first and the second tier of cells around it.

3. DATA STRUCTURES

The following data structures are implemented in the MSC to keep track of the network topology, interference conditions, and channel utilization. These information are used and updated by the channel allocation algorithms.

Neighbors Table (NT) contains information on all neighbors of each cell in the network. Since each cell has up to 19 neighbors, this table has N*19 elements, where N denotes total number of cells in the network. Notation NT[A][q]=B means that the q-th neighbor (in increasing order of cell identifies, and 0≦q—19) of cell A is cell B.

Interference Table (IT) contains information on actual interference conditions among network cells. Notation IT[A][q]=int_lvl means that the actual interference level between cell A and its q-th neighbor is int_lvl, where int_lvl may be NO_INTERFERENCE, CO_CHANNEL_INTERFERENCE, or CO_ADJACENT_CHANNEL_INTERFERENCE (both co-channel and adjacent-channel interference). If NT[A][q]=B, and IT[A][q]=int_lvl, it means that int_lvl is the actual interference level between cells A and B.

Allowed Channels Table (ACT) contains information on channels that are currently allowed or not allowed for utilization given the actual interference conditions. Notation ACT[A][k]=all_sts means that the actual status of channel k in cell A is all_sts, where all_sts may be ALLOWED or NOT_ALLOWED.

Used Channels Table (UCT) contains information on actual utilization of channels in each network cell. Notation UCT[A][k]=util_sts means that the actual utilization status of channel k in cell A is util_sts, where util_sts may be USED, or NOT_USED.

4. DYNAMIC CHANNEL ALLOCATION FUNCTIONS

The following functions are executed in the MSC during channel allocation:

Update Interference Table: When an Interference Update message from base station is received in the MSC, the IT table is updated with actual interference levels measured in base stations.

```
Update_IT(int cell_id, int neighbor int int_lvl)
{
    IT[cell_id][neighbor]=int_lvl;
}
```

Initialize Allowed Channels Table: When the ACT table is initialized, all its elements are set to ALLOWED.

```
Init_ACT()
{
    for (cell=0; cell<N;cell++){
        for (channel =0;channel<Kmax;channel++){
            ACT[cell][channel]=ALLOWED;
        }
    }
}
```

Initialize Used Channels Table: When the UCT table is initialized, all its elements are set to NOT_USED.

```
Init_UCT()
{
    for (cell=0;cell<N;cell++){
        for (channel=0;channel<Kmax;channel++){
            UCT[cell][channel]=NOT_USED;
        }
    }
}
```

Allocate Radio Channel: When a channel is allocated, its util_sts in the UCT table becomes USED for the cell in which it is used. The all_sts of the channel in the ACT table becomes NOT_ALLOWED for all the cells that might suffer from co-channel interference. In addition, the all_sts of adjacent channels changes to NOT_ALLOWED for all cells that might suffer from adjacent-channel interference.

```
void Allocate_Channel(UWORD cell, UWORD channel)
{
   UCT[cell][channel] = USED;
   ACT[cell][channel] = NOT_ALLOWED;
   ACT[cell][channel-1] = NOT_ALLOWED;
   ACT[cell][channel+1] = NOT_ALLOWED;
   for (q=1;q<=19;q++){
      neighbor = NT[cell][q];
      interference = IT[cell][q];
      switch (interference){
         case 0;
            break;
         case 1:
            ACT[neighbor][channel]=NOT_ALLOWED;
            break;
         case2:
            ACT[neighbor][channel]=NOT_ALLOWED;
            ACT[neighbor][channel-1]=NOT_ALLOWED;
            ACT[neighbor[channel+1]=NOT_ALLOWED;
            break;
         default:
            /*Error*/
            exit(0);
      }
   }
}
```

Release Radio Channel: When a channel is released, its util_sts in the UCT table becomes NOT_USED for the cell in which it is used. The all_sts of the channel in the ACT table becomes ALLOWED for all the cells that could have suffered from co-channel interference during the call. In addition, the all_sts of adjacent channels in the ACT table changes to ALLOWED for all cells that could have suffered from adjacent-channel interference.

```
void Release_Channel(UWORD cell, UWORD channel)
{
   UCT[cell][channel] = NOT_USED;
   ACT[cell][channel] = ALLOWED;
   ACT[cell][channel-1] = ALLOWED;
   ACT[cell][channel+1]= ALLOWED;
   for (q=1;q<=109;q++){
      neighbor=NT[cell][q];
      interference=IT[cell][q];
      switch (interference){
         case 0;
            break;
         case 1:
            ACT[neighbor][channel]= ALLOWED;
            break;
         case 2:
            ACT[neighbor][channel]= ALLOWED;
            ACT[neighbor][channel-1]= ALLOWED;
            ACT[neighbor[channel+1]= ALLOWED;
            break;
         default:
            /*Error*/
            exit(0);
      }
   }
}
```

5. INTERFERENCE DEFINITIONS AND MEASUREMENTS

To achieve a higher throughput, a spectrum reuse mechanism is used in cellular networks. It allows the same radio channels to be used simultaneously in different cells of the network as long as interference constraints are obeyed. The constraints depend on propagation of radio signals in the network, which is a complex function of different time-variable parameters.

Co-channel and adjacent-channel interference are factors which may significantly deteriorate quality of transmission. They may appear in the receiver of a base station operating on any radio channel. Co-channel interference may occur when two cells use the same channel simultaneously, and the signal in one cell is deteriorated by the signal from the other cell. To reduce this type of interference, the same channel should be used simultaneously in cells which are distant enough so that a sufficient level of carrier-to-interferer ratio is maintained. Adjacent-channel interference appears when a signal is deteriorated by interference caused by signal(s) from adjacent radio channel(s).

5.1 MEASURING CO-CHANNEL INTERFERENCE

Carrier to interference plus noise ratio C/(I+N) can be considered as a measure of co-channel plus adjacent channel interference in cellular networks. A base station can measure C/(I+N) of a live mobile phone call in a non-interfering manner. To do so, one can measure the bit error rate and calculate C/(I+N). In an analog mode such as AMPS, a blank-and-burst acknowledgment on the reverse voice channel can be used to measure bit error rate [Str90].

The following algorithm can be used to calculate C/(I+N).

If we measure $N_{Err}$ bit errors in the time interval $T_m$ then Probability of Error $(P_E)$ is:

$$P_E = \frac{N_{Err}}{T_m}$$

It is also true that, $$P_E = Q\left(K\sqrt{\frac{E}{\eta}}\right)$$

Where K is a constant depending on the modulation scheme (e.g. K=1.1 for AMPS), E is the average energy per bit and $\eta$ is the noise level per Hertz.

Function Q is defined as:
Function Q is defined as:

$$Q(x) = \frac{\mathrm{erf}\left(\frac{x}{\sqrt{2}}\right)}{2}$$

Hence we can find E/η. If B is the receiver bandwidth and T is the unit bit duration then:

$$\frac{c}{(I+N)} = \frac{E}{\eta BT}$$

For AMPS carrier to interference ratios of below 18 dB are acceptable.

5.2 ADJACENT CHANNEL REJECTION

Adjacent-channel interference is another factor that may reduce the quality of the radio signal. One of the goals in the design of radio equipment is to achieve a high selectivity of radio signals, or, in other words, to minimize/reject all unwanted signals (such as signals in adjacent channels) in the receiver.

Figure 2:
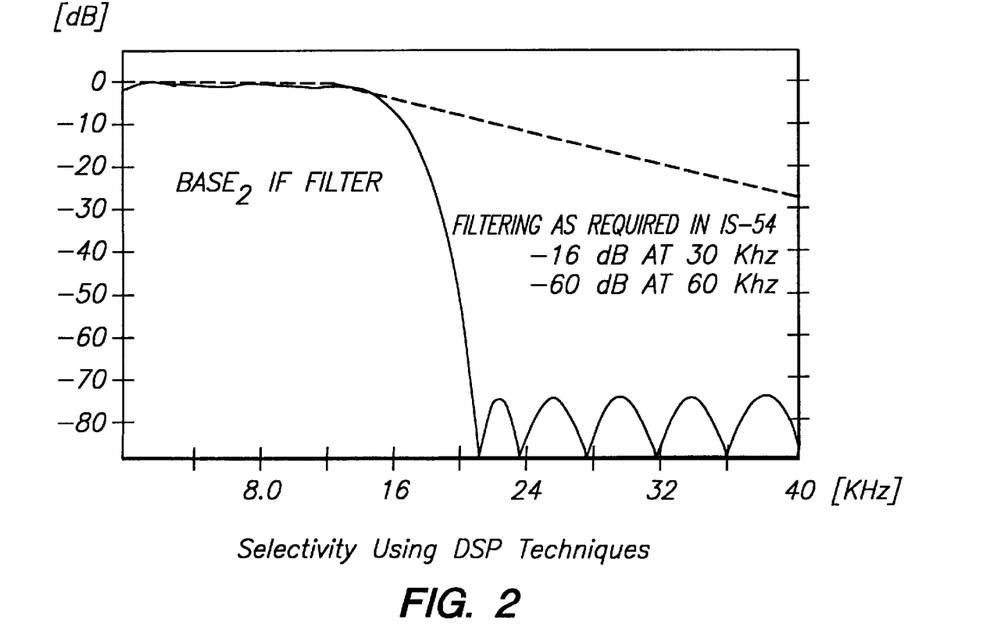
FIG. 2 illustrates a digital filter output compared to an analog filter output.

Using digital filters greatly improves the rejection of adjacent channels when compared to analog receivers. For comparison, the dashed line in FIG. 2 shows the AMPS standard selectivity specification. The solid line is the selectivity using a sharp digital filter. A digital receiver can easily achieve a filter loss of 70 dB at the adjacent channel using a 100 Tap FIR filter. In addition to the filter loss, the path loss also attenuates an incoming adjacent channel signal.

If the mobile on an adjacent channel is twice as far (d1) as the 'on-channel' mobile (d2) then:

$$\text{Path Loss}=40 \text{ Log } (d1/d2)=40 \text{ log } (2)=12 \text{ dB}$$

Hence, using digital filter technology the adjacent channel rejection at the base station receiver and transmitter is approximately 82 dB. With this type of adjacent channel rejection at the base station, reuse of an adjacent channel at a neighboring cell is possible which in turn increases the throughput of the system.

TABLE 1

Truth Table for Interference Levels

| int_lvl | Measured C/(I + N) | Adjacent channel interference |
|---|---|---|
| 0 = no interference | >threshold | don't care |
| 1 = co-channel interference | <1/(1/threshold + ACI) | <1/threshold |
| 2 = co-channel and adjacent channel interference | <threshold and not case 1 | don't care |

Table 1 is a truth table to estimate the interference type (either none, co-channel only or both co-channel and adjacent channel). Adjacent channel interference (ACI) can be estimated by tuning a receiver to both of the adjacent channels and measuring their power. ACI in Table 1 is calculated by adding the measured power from both adjacent channels and subtracting a constant which corresponds to the filter shape. For example if the adjacent channel to the left of the desired channel is −40 dBc and the right channel is −50 dBc. Assuming the constant is 16 dB (AMPS specification), ACI is estimated as [Str90]:

$$ACI=10\text{Log}_{10}(10^{-4}+10^{-5})-16dB=-55.6dBc$$

The Threshold in Table 1 is defined as the maximum amount of interference allowed in the system, assuming that the call is maintained as a high quality call.

Interference Levels Examples

Assume Threshold=63.1 (18 dB)

Example 1 No Interference

If C/(I+N)=100 (20 dB) and ACI=0.001 (−30 dB)
Case 0 is true since 100>63.1
Case 1 is false since 100 is not smaller than 1/(1/63.1+0.001)=59.35
Case 2 is false since 100 is not smaller than 63.1

Example 2 Co-channel Interference

If C/(I+N)=39.8 (16 dB) and ACI=0.001 (−30 dB)
Case 0 is false since 39.8 is not larger than 63.1
Case 1 is true since 39.8<1/(1/63.1+0.001)=59.35 and 0.001<1/63.1

Example 3 Both Co-channel and Adjacent Channel Interference

If C/(I+N)=25.1 (14 dB) and ACI=0.0251 (−16 dB)
Case 0 is false since 25.1<63.1
Case 1 is false since true that 25.1<1/(1/63.1+0.001)=59.35 but 0.0251 is not smaller than 1/63.1
Case 2 is true since 25.1<63.1

5.3 PROTOCOL FOR PERIODICAL UPDATE OF INTERFERENCE LEVELS

The MSC periodically updates information on interference conditions among network cells. This update is performed through a set of actions taken by the MSC and base stations. The protocol of updating interference conditions is as follows:

When the MSC wants to update these information, it sends a Measure Interference message to all base stations that are under its control.

The MSC starts its internal timer Int_Meas_Timer to control the time interval in which the MSC will collect Interference Update messages from all cells.

Each base station measures interference with neighboring cells, creates the response, and sends it back as an Interference Update message to the MSC.

The MSC updates the information on actual interference conditions in its memory.

When the MSC receives Interference Update messages from all cells in the network, or if Int_Meas_Timer expires, one cycle of the IT table updating is completed. In the first case, the MSC stops Int_Meas_Timer.

The MSC continues to allocate radio channels to new calls using the updated information in the IT table.

The MSC supports the ongoing calls (originated before the update of constraints) using the already allocated radio channels, if it is possible.

If the interference conditions do not allow a high-quality communication on the already allocated radio channels, the MSC should allocate new channels to the ongoing calls using the updated information on interference constraints, and release the channels used previously (intra-cell handoff).

If the interference conditions deteriorate and new channels for the ongoing calls are not available, the calls are dropped.

5.4 PROTOCOL IMPLEMENTATION

Periodical update of interference conditions and constraints related to dynamic channel allocation is a new mechanism that can be added to the already existing standard functionalities of the MSC and base stations in cellular networks. This section describes how the already existing MSC and base stations can be expanded to enable this new system feature.

9. HARDWARE IMPLEMENTATION

Figure 9:
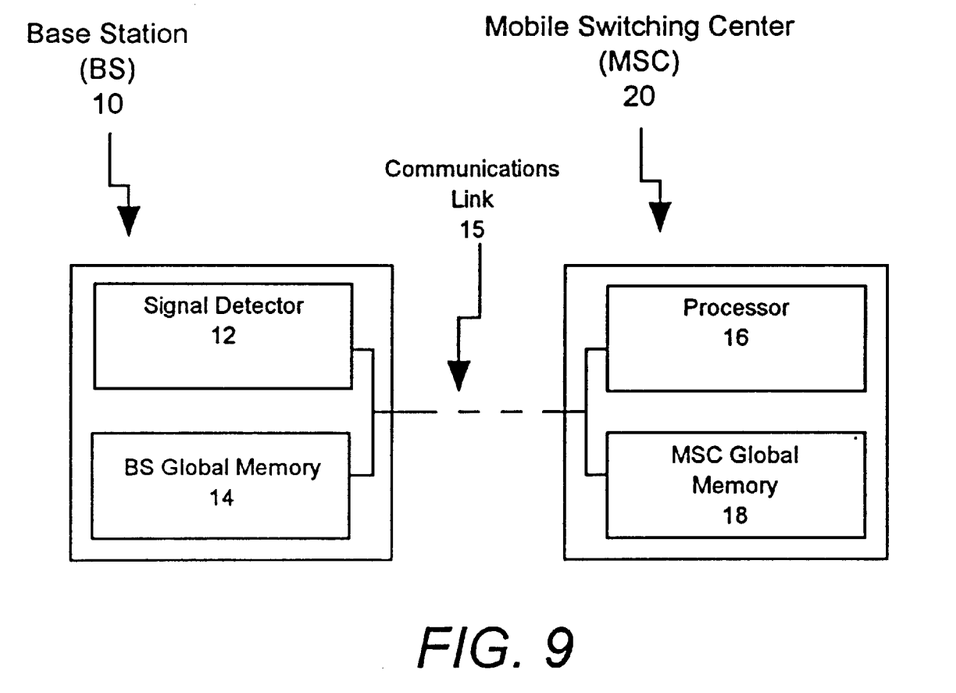
FIG. 9 depicts a Base Station and a Mobile Switching Center.

The invention is implemented using a base station and mobile switching center architecture well known in the art. FIG. 9 depicts an exemplary base station 10 and mobile switching center 20. The base station 10 contains a signal detector 12 and a base station global memory 14. The mobile switching center 20 contains a processor 18 and a mobile switching center global memory 18. The base station and the mobile switching center communicate via communications link 15, such as cable or wireless communications.

5.4.1 IMPLEMENTATION IN THE MSC

The MSC contains data structures defined in Section 4 in its global memory. These structures are periodically updated with actual measured interference conditions for each pair of network cells.

When the MSC wants to update interference conditions in the IT table, it sends a Measure Interference message to base stations. Base stations respond with Interference Update messages. The Measure Interference and Interference Update messages can be treated as an extension of the standard A+ Interface between base stations and the MSC. The mechanism of their transmission is the same as of all other A+ Interface messages.

We assume that interference between two cells which are not neighbors can be neglected. Therefore, it is sufficient to determine only interference levels between neighboring cells rather than all pairs of cells in the network. This reduces the amount of calculations from $N^2$ to $N*19$, where N is a total number of cells in the network, and N>19.

When an Interference Update message comes from base station A to the MSC, it performs the following actions:

- The MSC gets the received measured interference levels from base stations.
- Verifies that the received measurements are the most actual.
- Gets from the NT table the identities of all cells that are neighbors of cell A.
- Compares if both cell A and each of its neighbors have determined the same level of interference (i.e. if IT[A][B] would be equal to IT[B][A] after the update), and updates the IT table accordingly. If there is a difference the higher of the two measured interference levels will be written in both IT[A][B] and IT[B][A].
- If the MSC has collected Interference Update messages from all cells, or if the Int_Meas_Timer timeout interval has expired, the MSC concludes that the update of the IT table has been completed for this cycle.

The function that executes periodical interference updates in MSC is called MSC_Update_Interference. Its pseudocode is as follows:

```
void MSC_Update_Interference ()
{
UBYTE cell;
  for (cell=0;cell<N;cell++)}
  /*all network cells*/
    Prepare_Message_Header ();
    Put_Info_Elements ();
    Send_Meas_Interference_Msg(cell);
}
/*Start Int_Meas_Timer for the new cycle of interference
measurements*/
Start_Int_Meas_Timer ();
while (Int_Meas_Timer_Active){
  /*Wait for responses from base stations*/
  Receive_Interference_Update ();
  }
}
```

6.3.1.1 MESSAGE FORMATS

The TR-45 A-Interface protocol uses the Signaling Connection Control Part (ANSI-SCCP) of the Signaling System Number 7 (SS7) protocol as the transport layer. Both connectionless and connection-oriented services are utilized. The Message Transfer Part (ANSI-MTP) of the SS7 protocol is also used as the underlying layer, giving service to the SCCP layer. Only a subset of the SCCP and MTP capabilities are needed.

Figure 3:
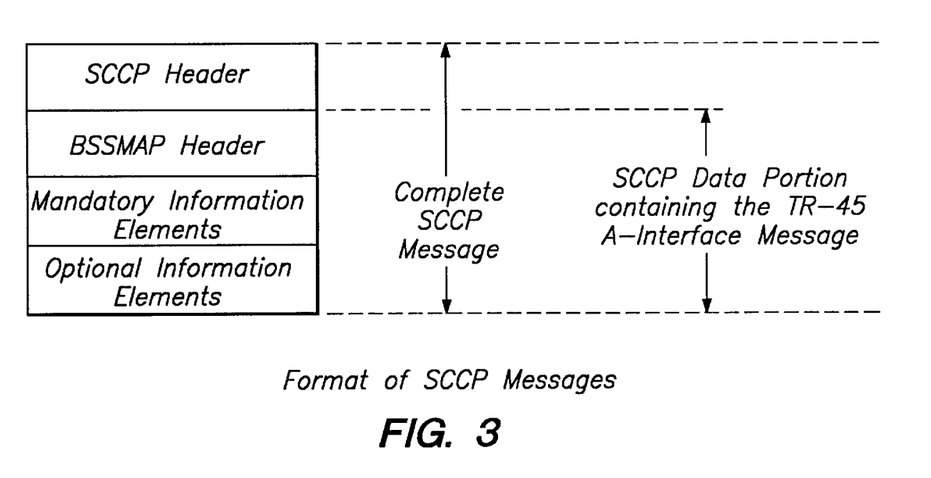
FIG. 3 illustrates a format for ANSI signaling connection control part messages.

The "Measure Interference" and "Interference Update" messages can be included into the standard set of Base Station Subsystem Management Application Part (BSSMAP) type messages. Their formats are shown in FIG. 3.

The BSSMAP Header contains the following fields:
Message Discriminator (1 byte);
Length indicator (1 byte).

Mandatory information elements of the "Measure Interference" message include:
Message Type;
Cell ID;
Class Mark Information Type 2;
RF Channel ID;
Interference Measurement Reference Number.

The "Measure Interference" message does not contain any optional information elements.

Mandatory information elements of the "Interference Update" message include:
Message Type;
Cell ID;
Interference Measurement Reference Number;
Measured Interference Levels.

The "Interference Update" message does not contain any optional information elements.

6.3.1.2 THE FORMAT OF THE MEASURED INTERFERENCE LEVELS INFORMATION ELEMENT

Most of the information elements listed above have already been a part of the TR-45 standard. The new information element that should be included to the set of standard information elements is Measured Interference Levels. Its format is as follows:

```
typedef struct {
   unsigned int_lvl[19]:2;
} INT_LVL_TYPE;
INT_LVL_TYPE*Meas_Interf_Lv1;
```

Each int_lvl element of the INT_LVL_TYPE structure denotes a level of interference between the cell which measures the interference and each of its neighbors. Two cells are considered as neighbors if one of them belongs to either first or second tier of cells around the other. Each cell is considered as its own neighbor. Therefore, each cell has 19 neighbors: itself, 6 neighbors in the first tier, and 12 neighbors in the second tier.

We assume that interference between two cells which are not neighbors can be neglected. Therefore, it is sufficient to determine only interference levels between neighboring cells rather than all pairs of cells in the network. This reduces the amount of calculations from $N^2$ to $N*19$, where N is a total number of cells in the network, and N>19. The int_lvl elements are given in the INT_LVL_TYPE structure in increasing order of their one-dimensional cell identities. For example, if cell 25 has the following neighbors: 25, 31, 32, 26, 19, 18, 24, 38, 39, 33, 27, 20, 13, 12, 11, 17, 23, 30, and 37, the measured interference levels will be sorted in the INT_LVL_TYPE so that they correspond to the neighboring cells in the following order: 11, 12, 13, 17, 18, 19, 20, 23, 24, 25, 26, 27, 30, 31, 32, 33, 37, 38, and 39, respectively. The order of interference levels in the INT_LVL_TYPE structure is very important because the order implicitly denotes the identity of the neighboring cell.

Each int_lvl may have one of the following values: 0 (NO_INTERFERENCE), 1 (CO_CHANNEL_INTERFERENCE), or 2 (CO_ADJACENT_CHANNEL_INTERFERENCE).

6.3.1.3 UPDATE OF THE INTERFERENCE TABLE IN MSC

When an "Interference Update" message comes to MSC from base station A, MSC performs the following actions:
Verifies that the received Interference Measurement Reference Number information element correspond to the same type information element that has been most recently sent in the "Measure Interference" message to base station A. In other words, MSC verifies that the received measurements are the most actual.

Gets from the NT table the identities of all cells that are neighbors of cell A.

Gets the received Measured Interference Levels information element, compares if both cell A and each of its neighbors have determined the same level of interference (i.e. if IT[A][B] would be equal to IT[B][A] after the update), and updates the IT table accordingly. If there is a difference the higher of the two measured levels of interference will be written in both IT[A][B] and IT[B][A].

```
void Update_IT()
{
   for (I=0; I<=19;I++)}
      /*Get ID of the next neighbor of cell A*/
      next_neighbor=NT[A][I];
      /*Find the index q of cell A as a neighbor of next_neighbor*/
      q=0
      while (NT[next_neighbor][q]!=A){
         q++;
      }
      /*Find the index p of cell next_neighbor as a neighbor of A */
      p=0;
      while (NT[A][p]!=next_neighbor)}
         p++;
      }
      /*Update IT table*/
      if (IT[next_neighbor][q]==Meas_Interf_Lvl->int_lvl[I]}
         IT[A][p]=Meas_Interf_Lvl->int_lvl[I];
      }
      else {
         if(IT[next_neighbor][q]<Meas_Inter_Lvl->int_lvl[I]{
            IT[A][p]=Meas_Interf_Lvl->int_lvl[I];
            IT[next_neighbor][q]=Meas_Interf_Lvl->int_lvl[I];
         }
         else {
            IT[A][p]=IT[next_neighbor][q];
         }
      }
   }
}
```

If MSC has collected Interference Update messages from all cells, or if the timeout interval of Int_Meas_Timer has expired, MSC concludes that the update of the IT table has been completed for this cycle.

5.4.2 IMPLEMENTATION IN BASE STATION

Each base station should contain a Partial Neighbor Table (PNT) in its global memory. This table contains information on all neighbors of the cell that is covered by this base station, in ascending order of their cell identities. In base station A, the notation PNT[q]=B, where (q=0,1,2, . . . ,18), means that the q-th neighboring cell of cell A is cell B.

When base station A receives a Measure Interference message from the MSC, it executes the following:

Takes one-by-one cell identities of the neighboring cells of cell A from its PNT table.

For each neighbor, the base station A measures co-channel and adjacent-channel interference (as is described in section 5.1).

For each neighbor, base station A determines if co-channel and adjacent-channel interference are lower than the predefined threshold. If both co-channel and adjacent-channel interference between cells A and its q-th neighbor (q=0,1,2, . . . ,18) are higher than the threshold, the corresponding measured interference level is set to CO_ADJACENT_CHANNEL_INTERFERENCE. If co-channel interference is higher, and adjacent-channel interference is lower than the threshold, the corresponding measured interference level is set to CO_CHANNEL_INTERFERENCE. If both co-channel and adjacent-channel interference are lower than the threshold, the corresponding measured interference level is set to NO_INTERFERENCE.

Base station A creates an Interference Update message of all measured interference levels from its neighbors.

Base station A sends the Interference Update message to the MSC.

The function BS_Interference_Update executes the actions described above in each base station A (A=0,1, . . . ,N−1). Its pseudo-code is given here:

```
void BS_Interference_Update ()
{
BYTE next_neighbor;
   for (next_neighbor=0;next_neighbor<19;next_neighbor ++){
      /*Find each neighbor of cell A*/
      neighbor=PNT[next_neighbor];
      /*Measure co-channel and adjacent-channel interference with each neighbor */
      Measure_Interference (A, neighbor);
      /*Determine interference level for each neighbor and update
      **the Measured Interference Levels information element */
      Set_Interference_Level (A, neighbor);
   }
   /*Prepare "Interference Update" message */
   Put_Header ();
   Put_Information_Elements();
   /*Send "Interference Update" message to MSC */
   Send_Interference_Update ();
}
```

6. OFFERED LOAD

We start from the common assumptions in telephone traffic engineering that call arrivals may be modeled by a Poisson process, and that the distribution of call duration times is exponential [Fil87].

The channel allocation mechanism proposed in this paper takes into consideration fluctuations of the offered load and activates the algorithm which provides the best performance (among the available algorithms) for current load and its distribution over the network. Updating the information on current offered load requires additional activities in both MSC and base stations.

MSC Activities:

The MSC periodically sends a Measure Average Hourly Offered Load message to all base stations.

The MSC receives Offered Load Update messages from base stations.

The MSC determines if the load values have changed since the previous measurement, as well as if the load is uniform/non-uniform in the network. Based on these findings, the MSC decides if it is necessary to activate another channel allocation algorithm to improve performance.

If another channel allocation algorithm should be activated, the MSC provides a smooth transition from the current to the new algorithm. During the transition, the MSC keeps information on currently active calls in order to prevent loss of communication among active mobile users due to the change of the algorithms.

Base Stations Activities:

Base station receives a Measure Average Hourly Offered Load message from the MSC.

In its mass storage each base station contains records of call attempts that enable statistical calculations of actual offered load. Base station takes information on the number of call attempts in the previous time interval, and divides it by the length of the time interval. The ratio represents the actual offered load of the base station.

Base station sends the Offered Load Update message containing the actual offered load to the MSC.

7. DYNAMIC CHANNEL ALLOCATION

Dynamic channel allocation is a mechanism that allows each channel from the cellular spectrum to be used in every cell. It should be implemented in both the MSC and base stations. Base stations should support the standard A+ Interface protocol with several modifications/extensions. The decision-making on channel allocation, and keeping track on actual channel availability is moved from base stations to the MSC. So, instead of searching for an available channel in their own data structures, base stations should just receive the identity of an available channel from the MSC, and tune its corresponding components to the allocated channel. When a channel should be released, the base station deactivates these components, and sends a Release message to the MSC. The MSC changes the availability status of the channel, and allows it to be used for another calls.

Dynamic channel allocation has been proven [Cha86, Dim93, Eri88, Eve89, Sen80, Vuc92a, Yue91, Zha89b] to provide a considerably higher throughput than fixed channel allocation, which has been widely used in practice [Jak74, Lee89]. With new wideband base stations, dynamic channel allocation becomes a feasible and more attractive solution than fixed channel allocation.

Dynamic channel allocation is restricted by the following rules:

A channel can be allocated to only one mobile user in a cell at a time;

A channel cannot be used simultaneously in two cells if the corresponding interference level is CO_CHANNEL_INTERFERENCE or CO_ADJACENT_CHANNEL_INTERFERENCE;

Two adjacent channels cannot be used simultaneously in two cells if the corresponding interference level is CO_ADJACENT_CHANNEL_INTERFERENCE.

7.1 SINGLE-ALGORITHM DYNAMIC CHANNEL ALLOCATION

We define a mechanism in the MSC which controls channel allocation and which is based on a single decision-making algorithm as a single-algorithm dynamic channel allocation. It consists of several activities performed in the MSC and base stations:

Periodical measurement and update of interference levels;
Periodical measurement and update of offered load;
Searching for an available channel;
Call processing control (Call origination, Call termination, Handoff control).

Periodical measurement and update of interference levels and offered load have been described in Sections 5 and 6, respectively. In this section, we shall discuss searching for an available channel and call processing controls listed above.

7.1.1 SEARCHING FOR AN AVAILABLE CHANNEL

When a channel should be allocated, the ACT table is searched for an available channel. If ACT[A][k]= AVAILABLE, channel k is available for utilization in cell A. Otherwise, it should not be used.

There are different ways of searching the ACT. Here we analyze four algorithms:

Algorithm 1: The ACT is always searched in increasing order of channel indices k. The first available channel (the smallest k) is selected for allocation.

```
WORD Find_Channel_1 (WORD cell)
{
WORD channel;
    channel = 1:
    while ((channel <=K)&&(ACT[cell][channel]=0)){
        channel++;
    }
    if(channel > K){
        return (NULL);
    }
    else {
        return (channel );
    }
}
```

Algorithm 2: The ACT is searched once in increasing order of channel indices k starting from k=1, then once in decreasing order of channel indices k starting from k=K. The first available channel (the smallest or the largest, respectively) is selected for allocation. This procedure is repeated with each new call requests.

```
WORD Find_Channel_2 (WORD cell)
{
WORD channel;
    if (Direction=UP){
        channel=1;
        while ((channel<=K)&&(ACT[cell][channel]=0)){
            channell++;
        }
        Direction=DOWN;
        if(channel>K){
            return (NULL);
        }
        else {
            return (channel);
        }
    }
    else {
        channel=K;
        while ((channel<=K)&&(ACT[cell][channel]=0)){
            channel--;
        }
        Direction=UP;
        if(channel>0)}
            return(NULL);
        }
        else {
            return (channel);
        }
    }
)
```

Figure 4A:
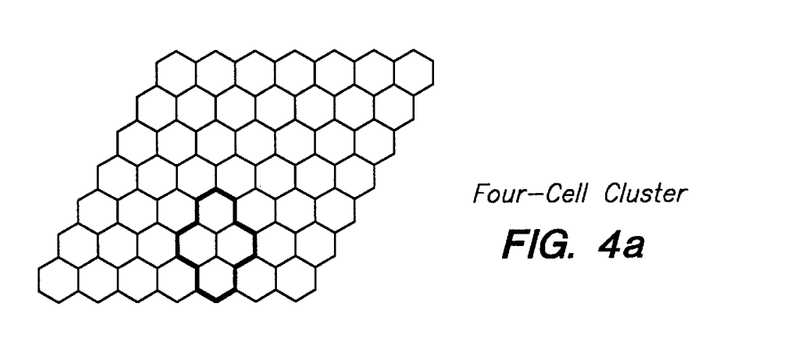
FIGS. 4A–B illustrate two optional cell clusters according to embodiments of the invention.

Algorithm 3: Each cell has its own subset of channels that may be allocated in this cell. The subsets are created obeying the interference constraints. Using digital filters, it is enough to provide four subsets (with already existing analog technology, it was necessary to provide seven subsets, which gives less channels per subset). Thus, the network is divided into exclusive four-cell clusters, as is shown in FIG. 4.a. Each cluster of the network is assigned the whole cellular spectrum, i.e. a cluster represents a unit of spectrum reuse. When a new channel should be allocated, the first one (the smallest or the largest k) is selected from the ACT. There is no significant influence on the availability of other channels neither in the same nor in another cells. This is an improved version of the fixed channel allocation algorithm.

The subsets of channels corresponding to 4-cell clusters are: k=4n, k=4n+1, k=4n+2, and k=4n+3, respectively, where n=0,1,2, . . . ,K/4−1.

Each cell belongs to one and only one cluster of cells, which has one out of four subsets of channels. A Cluster Table (CT) stores information on the cluster corresponding to each cell. Notation CT[A]=P means that cell A belongs to cluster P, where $$P \subset \{1,2,3,4\}.$$

```
WORD Find_Channel_3 (WORD cell)
{
WORD channel;
  switch (CT[cell]){
    case 1:
    case 2:
    case 3:
    case 4:
      channel =CT[cell]-1;
      break;
    default:
      /*Error*/
      return (NULL);
    }
  }
  while ((channel <=K)&&(ACT[cell][channel]=0)){
  channel +=4;
  }
  if (channel >K){
    return (NULL);
  }
  else {
    return (channel);
  }
}
```

Figure 4B:
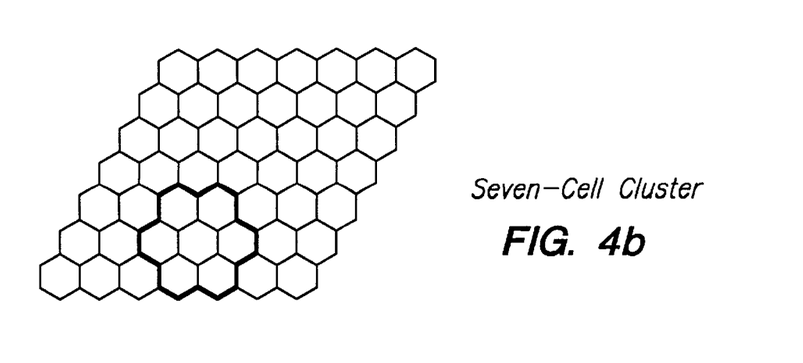

Algorithm 4: The same as Algorithm 3, but applied to 7-cell clusters, as is shown in FIG. 4.b. It represents a traditional fixed channel allocation, controlled and performed by base stations only, and using analog filters in the receivers.

7.1.2 CALL ORIGINATION CONTROL

When there is a call origination request, the base station sends an A+ Interface standard Setup message to the MSC. The MSC then activates its dynamic channel allocation procedure. Dynamic channel allocation during call origination in the MSC includes: searching for an available channel in the particular cell, reservation of the channel, and setting new constraints in interfering cells and channels. If there is an available channel, the MSC returns an Assignment Request message to the base station containing the channel identity. Upon receipt of the an Assignment Request message, the base station tunes its radio to the allocated channel, and establishes the voice channel with the mobile unit. If there is no available channel, the MSC should return a Release Complete message to the base station. Function Process_Call_Origination executes these activities.

```
void Process_Call_Origination (WORD Cell)
{
WORD Channel;
  Channel=Find_Channel(Cell);
  if (Channel){
    Allocate_Channel(Cell, Channel);
    Send_Assignment_Request(Cell, Channel);
  }
  else {
    Send_Release_Complete(Cell);
  }
}
```

7.1.3 CALL TERMINATION CONTROL

When the MSC receives a Release message from a base station, it indicates that a call processed by the base station should be terminated. The MSC then activates its dynamic channel allocation procedure for call termination. It includes release of the voice channel that has been use din the call, and deleting the relevant constraints for interfering cells and channels. The MSC sends a Release Complete message to the base station. Function Process_Call_Termination executes these actions.

```
void Process_Call_Termination (WORD Cell, WORD Channel)
{
  Release_Channel (Cell, Channel);
  Send_Release_Complete (Cell, Channel);
}
```

7.1.4 HANDOFF CONTROL

When a call should be handed-off from one to another cell, the source base station sends an A+ Interface standard Handoff Required message to the MSC. The MSC should then activate its dynamic channel allocation procedure for handoff. It includes searching for an available channel in the new cell, reservation of the new channel, release of the channel in the old cell that has been used in the call, and setting new constraints for interfering cells and channels for both old and new cell. If there is an available channel in the new (target) cell, the MSC returns a Handoff Command message to the old (source) base station, which indicates that the "old" channel will soon be released due to the handoff. The MSC also sends a Handoff Request message with the "new" channel identity to the target base station. IF there is no available channel in the target cell, the MSC returns a Handoff Required Reject message to the source base station. Function Process_Handoff executes these actions.

```
void Process_Handoff (WORD Old_Cell, WORD New_Cell,
WORD Old-Channel)
{
WORD New_Channel;
  New_Channel = Find_Channel (New_Cell);
  if (New_Channel){
    Allocate_Channel (New_Cell, New_Channel);
    Release_Channel (Old_Cell, Old_Channel);
    Send_Handoff_Command (Old_Cell, Old_Channel);
    Send_Handoff_Request (New_Cell, New_Channel);
  }
  else {
    Release_Channel (Old_Cell, Old_Channel);
    Send_Handoff_Required_Reject (Old_Cell, Old_Channel);
  }
}
```

7.1.4.1 SOFT HANDOFF

Current cellular systems define a rigid and systematic frequency reuse pattern. The most common pattern uses 7 cells, which can be further subdivided to form a 21 cell (sectored) plan.

A mobile unit is served by a cell as long as the signal quality is above a certain threshold. When a mobile's signal quality goes under a certain threshold, the mobile is handed-over to an adjacent cell. In the current system the mobile needs to retune its radio to one of the pre-assigned frequencies of the future hosting cell. This type of handoff is called a hard handoff, which is noticeable by the user since the service is temporarily disrupted due to the retuning sequence. If a mobile is handed-over to another cell without retuning its radio, this is called a soft handoff. This type of handoff is "smooth" and does not disrupt the conversation.

7.1.4.2 PERFORMING A SOFT HANDOFF

Typically the base station's radios are hardwired for fixed frequencies, however newer radios offer the capability to remotely tune to any portion of the cellular spectrum. With such radios, dynamic channel allocation and soft handoff are possible.

Figure 5:
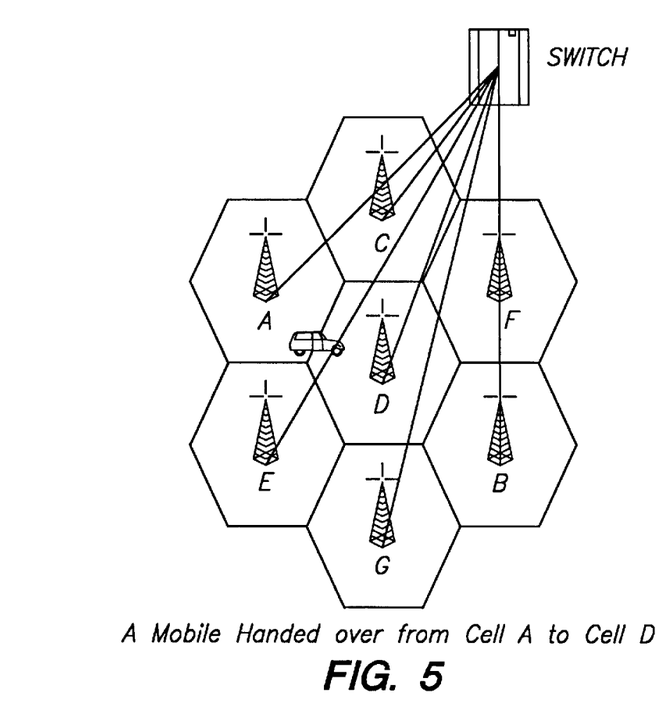
FIG. 5 illustrates a mobile unit hand over from cell A to cell D.

Performing a soft handoff in the current cellular system would violate the reuse pattern. However, coupled with a dynamic channel allocation, soft handoff is a natural extension. Shown in FIG. 5, a mobile is entering cell D and departing from cell A. Since the signal quality at cell A becomes degraded, cell A notifies the MSC that a handoff needs to occur. The MSC gets measurements on signal quality from all of the neighboring cells and instructs the cell with the best signal quality, in this case cell D, to host the mobile. Cell D will allocate a radio resource to the mobile and (if possible) it will tune it to the frequency the mobile is currently tune to. Cell A will break its link with the mobile only after the MSC notifies it that cell D is actively hosting. This is a make-before-break type of contact.

This type of soft handoff cannot always occur. There are events where several mobile units tuned to the same frequency arrive at the same cell or at neighboring cells. The MSC performs spectral management. It must maintain sufficient frequency and spatial separation between mobiles. For instance, two mobiles in the same or neighboring cells must have at least one RF channel separation.

7.2 MULTI-ALGORITHM DYNAMIC CHANNEL ALLOCATION

A multi-algorithm dynamic channel allocation mechanism consists of several channel allocation algorithms residing at the same time in the MSC of a cellular network. The algorithms are selected so that each one of them provides a significant performance advantage in comparison to the others under the given traffic and interference conditions. An algorithm becomes active in the network when the actual measured traffic and interference conditions indicate that this algorithm would provide the best performance in comparison to the other algorithms implemented in the MSC. The algorithm becomes passive when the traffic and interference conditions change so that another algorithm is expected to provide a better performance. Only one of the available algorithms can be active in the network at a time.

In addition to the dynamic channel allocation activities described in Section 7.1, the MSC also executes the following activities while performing multi-algorithm dynamic channel allocation:

Selection of the algorithm according to the new traffic and interference conditions;

Transition from one to another algorithm.

Transition from one to another algorithm should be smooth and efficient: None of the calls in progress should be dropped, and there should not be any noticeable disruptions in the active voice channels due to the transition. If it is needed (due to possible interference constraints), intra-cell handoffs might be executed during the transition.

The mechanism consists of the following steps:

Each base station periodically measures actual offered load and interference conditions in its cell;

Each base station periodically reports these measurements to the MSC;

The MSC compares all available channel allocation algorithms to determine which one provides the best performance (minimal blocking probability) under the most recently measured conditions;

The MSC determines if the algorithm transition is needed or the currently active algorithm is the best for the actual conditions;

If the algorithm transition is not needed, the MSC continues operating with the actual algorithm until the next reports come from the base stations;

If the algorithm transition is needed, the MSC activates the new algorithm and turns off the old one;

If the new algorithm requires a fixed, predetermined set of available channels in each cell, and the actual channel availability does not fulfill the requirement, the MSC orders the base stations that utilize inappropriate (for the new algorithm) channels at the moment, to perform an intra-cell handoff to the channels that are allowed by the new algorithm.

The MSC continues operating with the new algorithm, which gets as input parameters information on the actual channel availability, actual traffic and interference conditions, customers, and calls.

The multi-algorithm channel allocation mechanism provides a significant improvement in network performance (maximize throughput) because it selects the most superior available channel allocation algorithm with respect to the actual traffic and interference conditions. On the other side, this mechanism requires additional processing both in the MSC and in base stations, as well as an extension in the A+ Interface (additional messages or information elements within the already existing messages). It might reduce the efficiency of the system. To overcome this disadvantage, several software and hardware solutions have been considered [Vuc91, Vuc92b, Vuc93b].

8. PERFORMANCE ANALYSIS

We performed simulations for a network consisting of 100 cells, assuming that: the average cell size is 1 mile, the maximal number of available radio channels is 333, the average speed of vehicles is 55 mphs, the average call duration is 105 seconds, the average time between call retrials (due to unsuccessful call origination) is 120 seconds, the average number of retrials is 4. Simulations were performed for the cases with and without updating the interference information in the IT table.

We analyze throughput as a performance measure, assuming that it represents a ratio between the number of successful calls and offered load.

Figure 6:
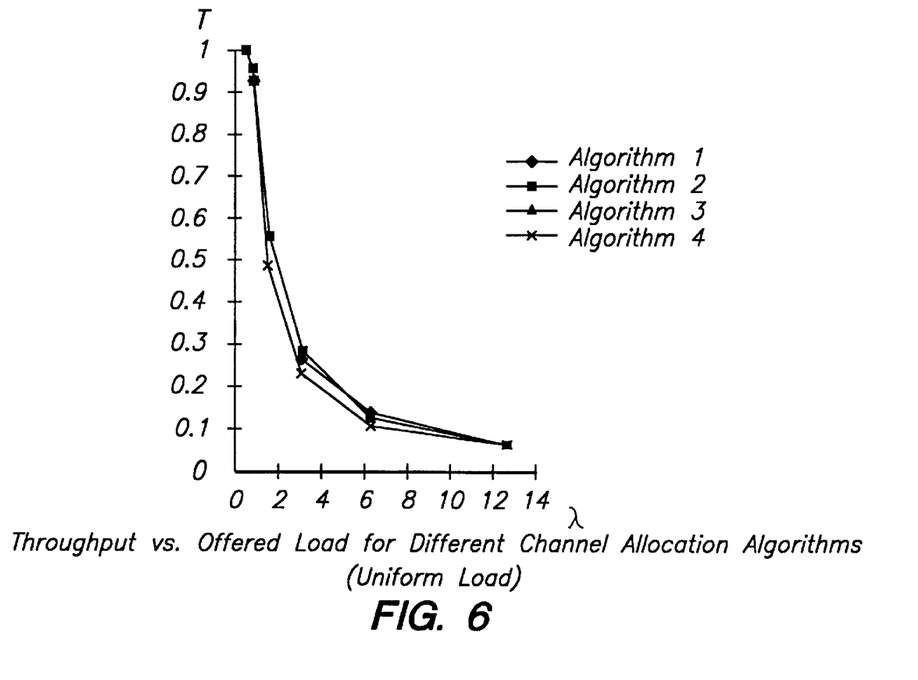
FIG. 6 is a graph showing throughput versus offered load for different channel allocation algorithms with uniform load.

Diagrams shown in FIG. 6 illustrate throughput vs. offered load when each of the channel allocation algorithms described above is applied. In case of uniform offered load, Algorithms 1, 2 and 3 have similar behavior, superior to Algorithm 4, as offered load is increased. Better performance of the three first algorithms illustrate the advantages of utilization of wideband techniques and digital filtering (Algorithm 3) as well as of more intelligent decision making during channel allocation (Algorithms 1 and 2) compared to traditional fixed channel allocation concept (Algorithm 4).

Figure 7:
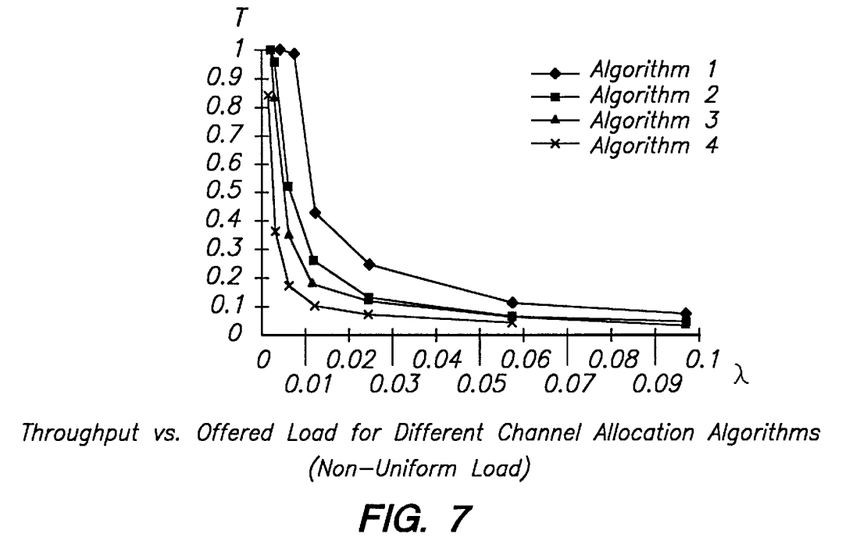
FIG. 7 is a graph showing throughput versus offered load for different channel allocation algorithms with non-uniform load.

In case of non-uniform offered load, as is shown in FIG. 7, the performance of Algorithms 1, 2 and 3 varies more than in the case of uniform load (FIG. 6). It is apparent that better performance is achieved with Algorithms 1 and 2 (dynamic channel allocation) than with Algorithm 3 (fixed channel allocation with digital filters). These diagrams also illustrate combined advantages of dynamic channel allocation and digital filters over traditional fixed channel allocation with analog filters (Algorithm 4).

Figure 8:
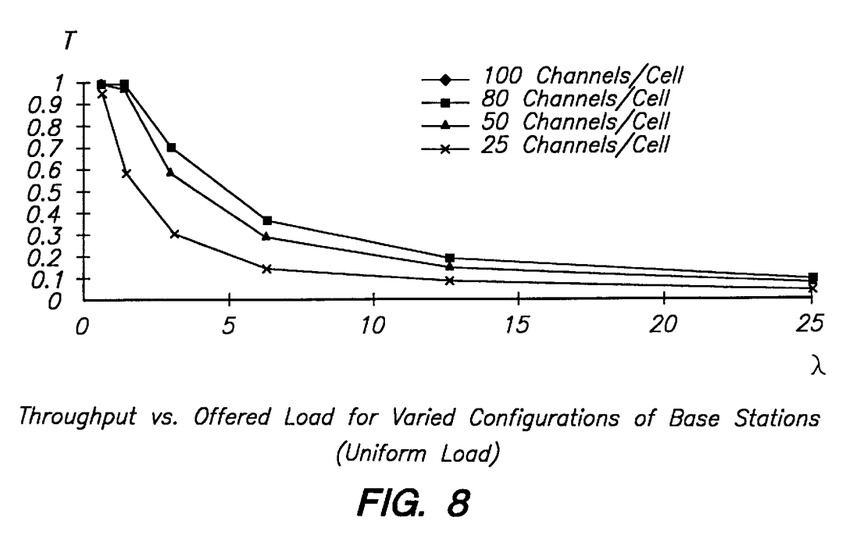
FIG. 8 is a graph showing throughput versus offered load for varied configuration base stations with uniform load.

Diagrams shown in FIG. 8 illustrate throughput vs. offered load when the maximal number of radio channels per cell (configuration of base stations) is varied, applying Algorithm 1. When base stations can handle higher number of channels, throughput is higher. However, as the number of channels/cell exceeds a certain value (in our case 80 channels/cell), the network reaches a saturation point. Additional channels per cell will not improve the performance because it is limited by another factor: the maximal number of available radio channels in the network (in our case, 333)

combined with interference constraints. This analysis may be useful for optimal network planning, where is important to achieve throughput as high as possible, while making minimal investments into the network equipment.

Diagrams shown in FIG. 9 illustrate the improvement in performance when decision making during dynamic channel allocation is based on actual (periodically updated) information on interference conditions in the network, compared to the decision making which does not take into consideration the fact that interference conditions vary. In the second case, a part of the offered load will be dropped due to deteriorated interference conditions, while these calls were in progress.

10. CONCLUSION

The invention describes different advantages of dynamic channel allocation and digital filtering related to better performance of cellular networks. Several new methods are proposed to increase the overall network throughput:

Digital filters, which provide better selectivity, and therefore increase channel reusability in the network;

Dynamic channel allocation with selection of the algorithm (among the available) which provides the highest throughput for the actual interference conditions and offered load;

Periodical updating the information on interference conditions and offered load, which are used during dynamic channel allocation. This enables better decision making because it is based on more accurate input data.

In addition, we illustrated how the configuration of base stations (maximal number of radio channels per cell) may affect the network performance. The presented analysis may be useful for optimal network planning, where it is important to achieve throughput as high as possible, while making minimal investments into the network equipment.

Advantages of the invention include improved computer system performance and reduced communication latency.

Having disclosed exemplary embodiments and the best mode, modifications and variations may be made to the disclosed embodiments while remaining within the scope of the invention as defined by the following claims.

What is claimed is:

1. A wireless communication system for use with a plurality of base stations each having a cell and configured to communicate with a plurality of mobile units in each respective cell, said base stations coupled to a mobile switching center, said system comprising:

a memory configured to store a transform table containing information regarding a physical layout of a plurality of cells, a neighbors table containing information regarding adjacent cells, an interference table containing information regarding interference conditions among said cells, an allowed channels table containing information regarding channels that are allowed for utilization, and a used channels table containing information regarding channels that are used;

a detector configured to detect an inbound channel strength and an adjacent channel strength to generate a detector signal; and a processor coupled to said memory and said detector and configured to receive said detector signal and assign communication channels to said base stations to avoid interference based at least in part on said detector signal and said tables.

2. The wireless communication system of claim 1, wherein:

said processor is configured to periodically update at least one if said tables in response to said detector signal.

3. The wireless communication system of claim 1, wherein:

said detector is configured to scan a plurality of received channels and to generate a detector signal for each of said received channels; and said processor is configured to periodically update at least one if said tables in response to said detector signal.

4. A method of communicating between a plurality of base stations and a plurality of mobile units, where each base station has a cell and is configured to communicate with a plurality of mobile units in each respective cell, and where said base stations are coupled to a mobile switching center, said method comprising the steps of:

storing a transform table containing information regarding a physical layout of a plurality of cells;

storing a neighbors table containing information regarding adjacent cells;

storing an interference table containing information regarding interference conditions among said cells;

storing an allowed channels table containing information regarding channels that are allowed for utilization;

storing a used channels table containing information regarding channels that are used;

detecting an inbound channel strength and an adjacent channel strength and generating a detector signal; and assigning communication channels to said base stations to avoid interference based at least in part on said detector signal and said tables.

5. The method of claim 4, further comprising the step of:

periodically updating at least one if said tables in response to said detector signal.

6. The wireless communication system of claim 4, wherein:

periodically scanning a plurality of received channels and generating a detector signal for each of said received channels; and periodically updating at least one if said tables in response to said detector signal.

* * * * *